(12) United States Patent
Kira

(10) Patent No.: US 8,601,400 B2
(45) Date of Patent: Dec. 3, 2013

(54) RETRIEVAL AND DISPLAY DEVICE

(75) Inventor: Youichi Kira, Osaka (JP)

(73) Assignee: Mitsubishi Electric Corporation, Tokyo (JP)

( * ) Notice: Subject to any disclaimer, the term of this patent is extended or adjusted under 35 U.S.C. 154(b) by 666 days.

(21) Appl. No.: 11/792,547

(22) PCT Filed: Dec. 2, 2005

(86) PCT No.: PCT/JP2005/022207
§ 371 (c)(1),
(2), (4) Date: Jun. 7, 2007

(87) PCT Pub. No.: WO2006/092895
PCT Pub. Date: Aug. 9, 2006

(65) Prior Publication Data
US 2008/0141163 A1    Jun. 12, 2008

(30) Foreign Application Priority Data
Mar. 2, 2005   (JP) .................................. 2005-057762

(51) Int. Cl.
*G06F 3/048*    (2013.01)
*G06F 1/14*    (2006.01)

(52) U.S. Cl.
USPC ............................. 715/858; 715/851; 715/781

(58) Field of Classification Search
USPC .......................................... 715/781, 775, 858
See application file for complete search history.

(56) References Cited

U.S. PATENT DOCUMENTS

| | | | |
|---|---|---|---|
| 5,856,827 A | | 1/1999 | Sudo et al. |
| 5,896,132 A | * | 4/1999 | Berstis et al. .................. 715/786 |
| 6,195,094 B1 | * | 2/2001 | Celebiler ....................... 715/764 |
| 6,734,883 B1 | * | 5/2004 | Wynn et al. .................... 715/830 |
| 2003/0023435 A1 | * | 1/2003 | Josephson ..................... 704/235 |

FOREIGN PATENT DOCUMENTS

| | | |
|---|---|---|
| JP | 1-118190 A | 5/1989 |
| JP | 5-11966 A | 1/1993 |
| JP | 8-95732 A | 4/1996 |
| JP | 8-212038 A | 8/1996 |
| JP | 9-233161 A | 9/1997 |
| JP | 11-136336 A | 5/1999 |
| JP | 2002-33795 A | 1/2002 |
| JP | 2003-84877 A | 3/2003 |

* cited by examiner

*Primary Examiner* — Andrea Legget
(74) *Attorney, Agent, or Firm* — Birch, Stewart, Kolasch & Birch, LLP

(57) ABSTRACT

A retrieval and display device includes an ascending-direction reading out section and an descending-direction reading out section, which read outs a folder name from a folder-name storing section, in response to an operating-direction signal from a storing and operation direction discriminating section and a display-linage signal stored in a display-linage section; and a mark-position changing section, which changes the position of a mark according to whether an operation is done in the ascending direction or in the descending direction. A display folder-name creation processing section places the mark on a folder name desired to be selected in the top line at the operating direction, and creates a display folder name such that the next candidate folder is displayed in the display screen.

2 Claims, 10 Drawing Sheets

DIRECTORY (EXAMPLE)

HIERARCHY of DIRECTORY

RETRIEVAL AND DISPLAY DEVICE

TECHNICAL FIELD

The present invention relates to a retrieval and display device suitable for retrieving within a limited display screen a desired folder name from among enormous numbers of folder names, e.g., in a small-sized display device.

BACKGROUND ART

This type of retrieval and display devices includes a retrieval and display device reading out a folder name belonging to the next level lower than that to which a desired folder name belongs, from a storing means, and displays a list of the folder names belonging to the level, in order to select a desired folder name from among enormous numbers of folder names stored in hierarchy of folders (see Patent Document 1, for example).

Patent Document 1: JP-A2003-084877 ([0112] and FIG. 3)

Since the conventional retrieval and display device is arranged as mentioned above, it must include a mass storage medium and a display having a large screen, in order to display the list of the folder names belonging to the hierarchy.

The present invention has been made to solve the above-mentioned problem, and an object of the present invention is to provide a retrieval and display device that facilitates a user to select a desired folder name by displaying the next candidate folder name along an operating direction together with the selected desired folder name within the limited display screen.

DISCLOSURE OF THE INVENTION

The retrieval and display device according to the present invention includes a display section having a display screen on which at least two or more lines of a folder name can be displayed; a display-linage storing section storing the number of display lines of the display section; a storing and operating direction discriminating section, upon reception of an operating signal from an operating section, discriminating an operating direction in contradistinction to the operating direction stored therein up to now; an ascending-direction reading out section and an descending-direction reading out section reading out a folder name from a folder-name storing section, in response to an operating-direction signal from the storing and operating direction discriminating section and a display-linage signal stored in the display-linage storing section; a mark-generating section generating a mark indicative of an operating position; a mark-position changing section moving the mark to the next candidate folder name if an operation is done in the ascending direction, or else moving the mark to the top line in the descending direction if an operation is done in the descending direction; and a display folder-name creation processing section putting a mark to the selected desired folder name at the top line in the operating direction, and creating a display folder name such that the next candidate folder name is displayed on the display screen, based on a folder name read out by the ascending-direction reading out section or the descending-direction reading out section, an operating-direction signal, and a mark-changing signal from the mark-position changing section.

According to the present invention, whether an operation is done in the ascending direction or in the descending direction, the next candidate folder name is displayed simultaneously with the selected desired folder name. Furthermore, when an operation is done in the opposite direction, the folder names in the opposite direction, which have not ever been displayed, can be displayed at a time as many as the number of display lines-1, starting from the top folder name. As a result, a searcher can immediately find a folder name, which is inadvertently missed and gone too far during retrieval, by reversing an operating direction. For this reason, this facilitates finding of a desired folder name from among enormous numbers of folder names within the limited display screen. Therefore, a desired folder name can be readily and promptly selected, e.g., from music folder names contained in a massive music library such as a music reproducing unit mounted on a vehicle. Accordingly, the retrieval and display device is exceedingly useful and advantageous to a driver.

BEST MODE FOR CARRYING OUT THE INVENTION

Embodiments of the present invention will now be described with reference to the accompanying drawings for describing the present invention in more detail.

First Embodiment

Figure 1:
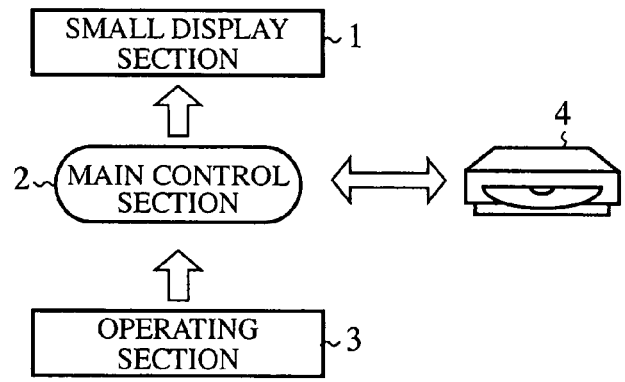
FIG. 1 is a schematic diagram showing the first embodiment of the present invention.
Figure 2:
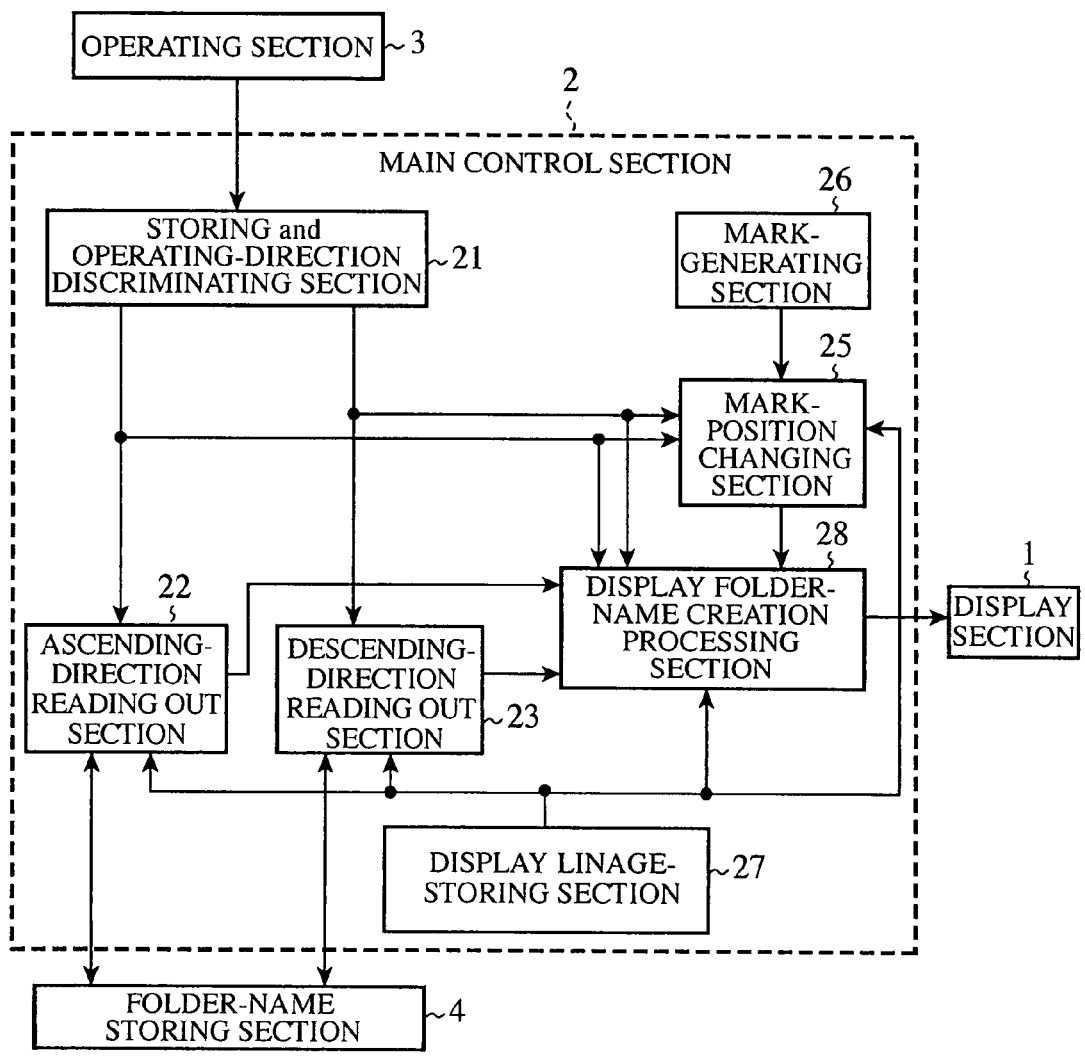
FIG. 2 is a block diagram showing the details thereof.
Figure 3:
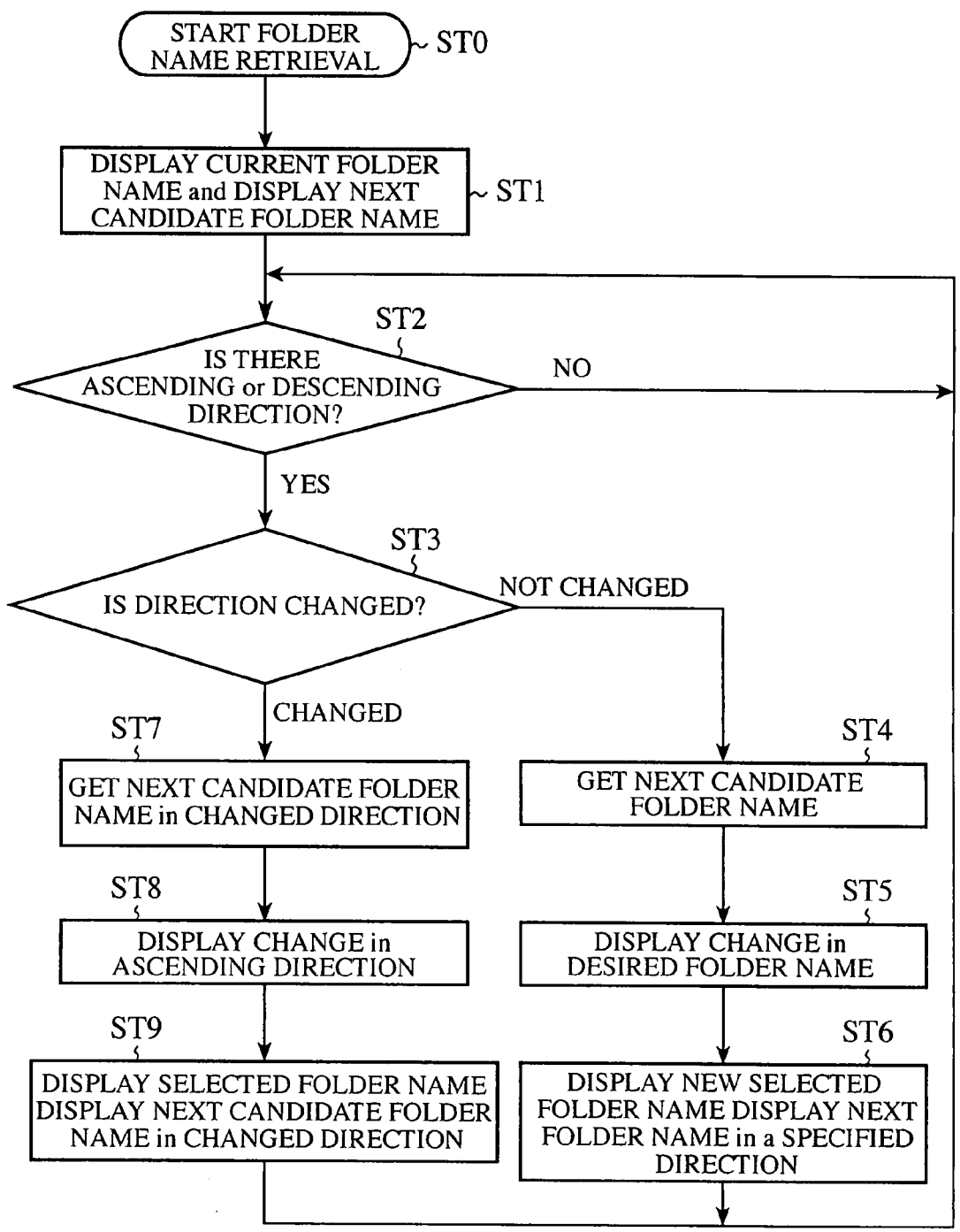
FIG. 3 is a general flowchart showing an operation thereof.
Figure 4:
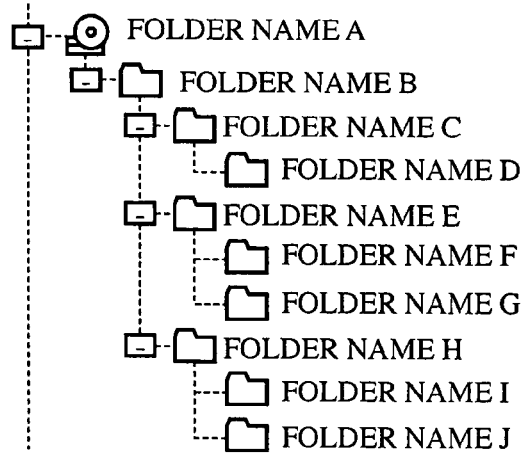
FIG. 4 is a directory showing folder names to be selected.
Figure 5:
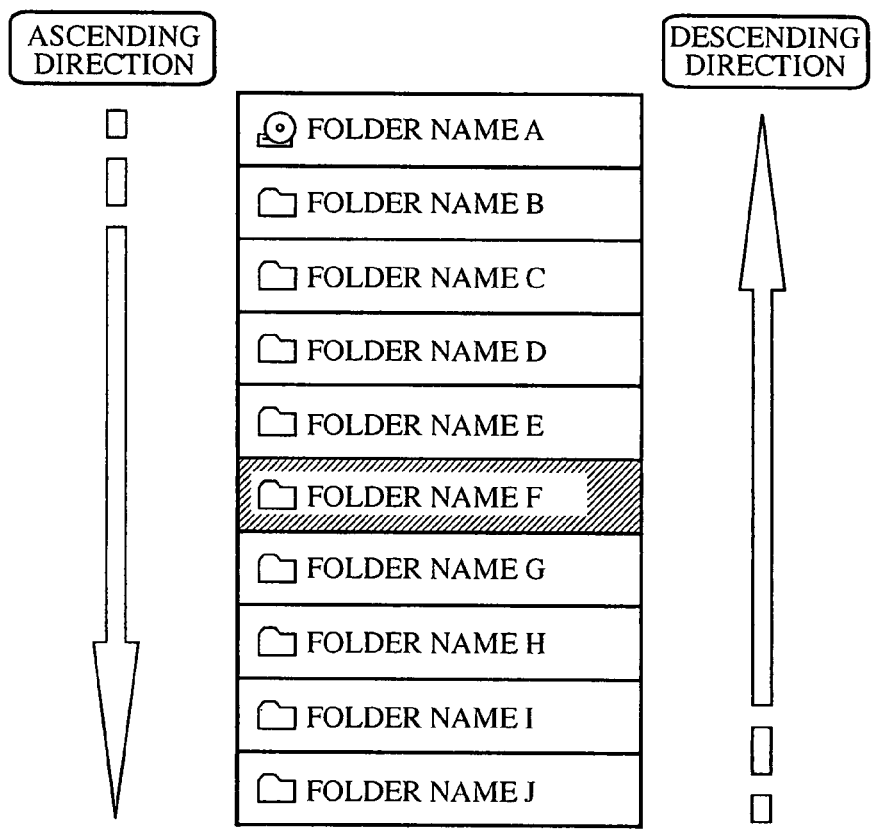
FIG. 5 is a hierarchy diagram hierarchically showing the folder names to be selected.

FIG. 1 is a schematic diagram showing the first embodiment of the present invention; FIG. 2 is a block diagram showing the details thereof; FIG. 3 is a general flowchart showing an operation thereof; FIG. 4 is a directory showing folder names to be selected; and FIG. 5 is a hierarchy diagram hierarchically showing the folder names to be selected.

The retrieval and display device according to the present invention includes, as shown in FIG. 1, a small display section 1 (hereinafter, referred to as a display section); a main control section 2; a panel-operating section 3 (hereinafter, referred to as an operating section); and a CD/DVD mechanism section 4 (hereinafter, referred to as a folder-name storing section).

The folder-name storing section 4 is made, e.g., of a mass storage media such as a HDD, DVD or CD-ROM, and stores enormous numbers of folder names. Further, in order to efficiently select a desired folder name from among these enormous numbers of folder names, these folder names are classified into a tree structure as shown in FIG. 4, and are hierarchically stored as shown in FIG. 5.

The main control section 2 includes, as shown in FIG. 2, a storing and operating direction discriminating section 21; an ascending-direction reading out section 22 reading out a folder name from the folder-name storing section 4 in the ascending direction; a descending-direction reading out section 23 reading out a folder name from the folder-name storing section 4 in the descending direction; a mark-position changing section 25 changing a position at which a mark output from the mark-generating section 26 is displayed, in response to an operating direction signal from the storing and operating direction discriminating section 21; a display-linage storing section 27 storing the number of display lines of the display section 1; and a display folder-name creation processing section 28.

The storing and operating direction discriminating section 21 stores, e.g., the number of pulses output from the operating section 3 when a desired folder name, which is currently being displayed, is selected, and discriminates an operating direction according to an increase or decrease in the number of stored pulses by a pulse output from the operating section in the next operation. The ascending-direction reading out section 22 reads out a folder name, hierarchically stored in the folder-name storing section 4, with folder names now being displayed shifted by one line in the ascending direction from the folder names currently displayed, and the descending-direction reading out section 23 reads out a hierarchically stored folder name from the folder-name storing section 4, at a time as many as the number of display lines-1 in the descending direction, starting from the last folder name, which is being currently displayed, i.e., the top folder name in the descending direction.

If an operating direction signal, which is output from the storing and operating direction discriminating section 21, is representative of the ascending direction, the mark-position changing section 25 sends a changing signal causing a mark position to move by one display line in the ascending direction, to a display folder-name creation processing section 28, or else if an operating direction signal is representative of the descending direction, the mark-position changing section 25 sends a signal causing a mark position to move to the last folder name, which is now being displayed, to the display folder-name creation processing section 28. Remark parenthetically, what storage form should be adopted for display line in the display-linage storing section 27 is left to a user's discretion; however, a user, who knows how many display lines can be displayed on the display screen, may previously input and store the number of display lines using an inputting means (not shown).

The display folder-name creation processing section 28 receives folder names corresponding to the number of display lines from the ascending-direction reading out section 22 or the descending-direction reading out section 23; and receives a mark-position changing signal from the mark-position changing section 25, i.e., a changing signal moving a mark by one line in the ascending direction if an operation is done in the ascending direction, or a changing signal moving a mark to the top line in the descending direction if an operation is done in the opposite. The display folder-name creation processing section 28 puts a mark to the position based on these mark-position changing signals; and displays the folder names on the display screen of the display section 1.

The operation thereof will now be described below.

Figure 6:
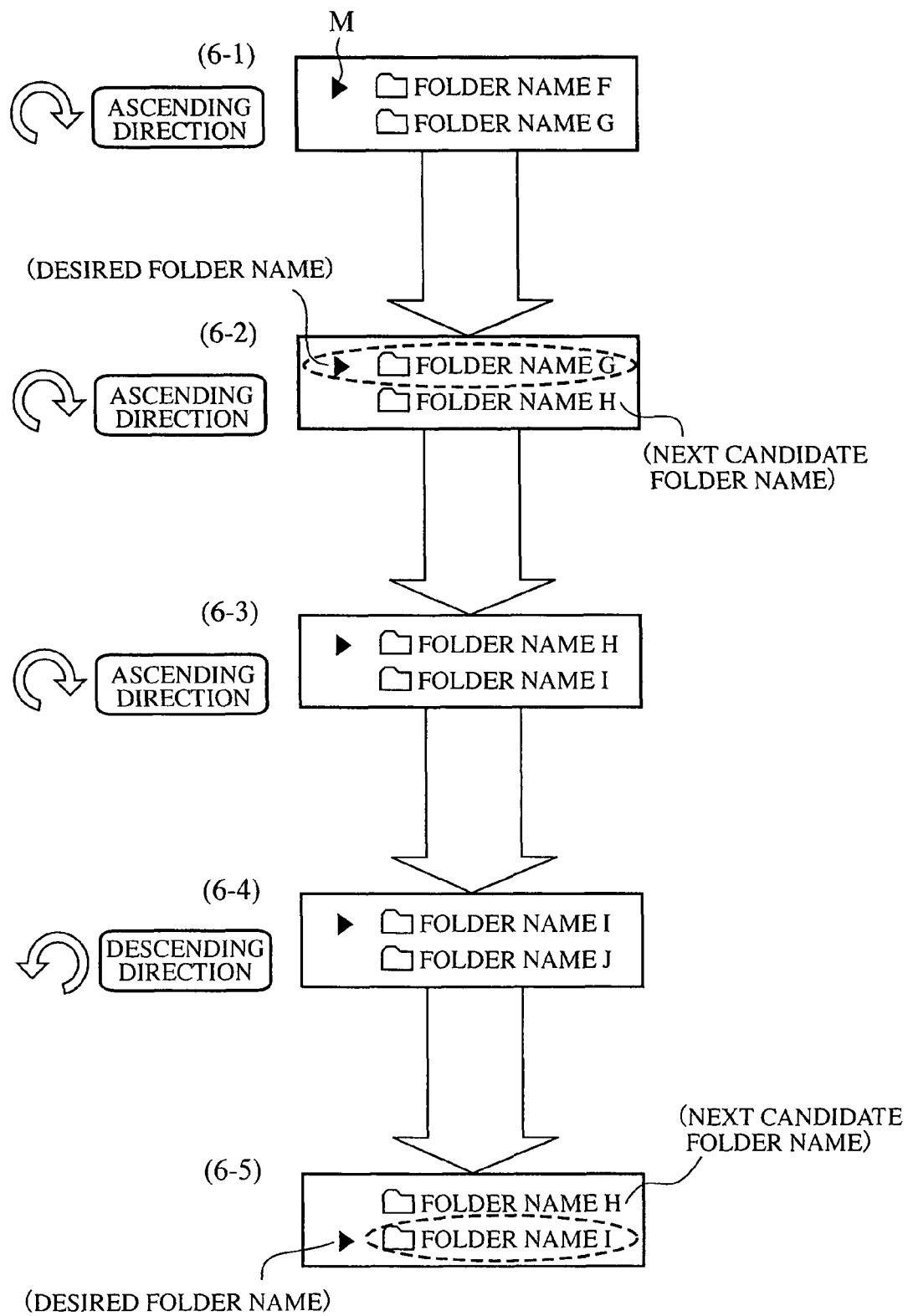
FIG. 6 is a display screen showing a state in which the display contents are changed by an operation in the ascending direction in the first embodiment.

FIG. 6 is a view showing a display screen of the display section 1 of which display contents are changed by a retrieval operation. In the first embodiment, the display screen of the display section 1 is set to 2 lines. Upon starting a folder name retrieval by an operation in the ascending direction (step ST0), a screen (6-1) shows, as an example, that the current desired folder name F and the next candidate folder name G in the ascending order are displayed on the display screen of the display section 1 (step ST1). Then, a judgment is made whether or not an operating signal in the ascending direction or in the descending direction is output (step ST2), and this judgment is repeated until an operating signal is output. When the operating signal is output, a judgment is made whether an operation is done in the ascending direction or in the descending direction (step ST3).

Now, upon operating the operating section 3 by one folder name in the ascending direction, in order to take the folder name G, which is the next candidate folder name, as a desired folder name, the judgment in step ST3 shows no change. Initially, the storing and operating direction discriminating section 21 receives a pulse corresponding to one folder name from the operating section 3 to discriminate that an operation is done in the ascending direction based on an increase in the number of stored pulses.

Subsequently, the mark-position changing section 25 sends a signal causing a mark M to move by one folder name in the ascending direction to the display folder-name creation processing section 28, in response to an ascending direction discriminating signal from the storing and operating direction discriminating section 21. Meanwhile, the ascending-direction reading out section 22 reads out the next candidate folder name H in the ascending direction from the folder-name storing section 4, and sends the folder name H to the display folder-name creation processing section 28, in response to the ascending-direction discriminating signal from the storing and operating direction discriminating section 21 and the number of display lines from the display-linage storing section 27 of the display section 1 (step ST4).

In the display folder-name creation processing section 28, the desired folder name G is moved to the top line, based on the read out folder name H sent from the ascending-direction reading out section 22 and the mark-position changing signal from the mark-position changing section 25; a display folder name is created so as to display the new next candidate folder name H at a line succeeding the top line; and the folder name is then sent to the display section 1 display thereon (steps ST5 and ST6). This state is shown in a screen (6-2).

In this state, upon operating the operating section 3 again by one folder name in the ascending direction, in order to take the folder name H, which is the next candidate folder name, as a desired folder name. Initially, the storing and operating direction discriminating section 21 receives a pulse corresponding to one folder name from the operating section 3, and discriminates that an operation is done in the ascending direction based on an increase in the number of stored pulses.

Subsequently, the mark-position changing section 25 sends a signal, which moves a mark M by one folder name in the ascending direction, to the display folder-name creation processing section 28 if the judgment in step ST3 shows a change, in response to an ascending-direction discriminating signal from the storing and operating direction discriminating section 21. Meanwhile, the ascending-direction reading out section 22 reads out the next candidate folder name I in the ascending direction from the folder-name storing section 4;

and sends the folder name I to the display folder-name creation processing section 28, in response to an ascending-direction discriminating signal from the storing and operating direction discriminating section 21 and the number of display lines from the display-linage storing section 27 of the display section 1.

In this display folder-name creation processing section 28, the desired folder name H is moved to the top line, based on the read out folder name I sent from the ascending-direction reading out section 22 and the mark-position changing signal from the mark-position changing section 25; a display folder name is created so as to display the new next candidate folder name I at the line succeeding the line; the display folder name is then sent to the display section 1 to display thereon. This state is shown in a screen (6-3).

In this state, upon operating the operating section 3 again by one folder name in the ascending direction, in order to take the folder name I, which is the next candidate folder name, as a desired folder name. First, the storing and operating direction discriminating section 21 receives a pulse corresponding to the one folder name from the operating section 3, and discriminates that an operation is done in the ascending direction based on an increase in the number of stored pulses.

Then, the mark-position changing section 25 sends a signal causing mark a M to move by one folder name in the ascending direction to the display folder-name creation processing section 28, in response to a ascending-direction discriminating signal from the storing and operating direction discriminating section 21. Meanwhile, the ascending-direction reading out section 22 reads out the next candidate folder name J in the ascending direction from the folder-name storing section 4; and the reading out section sends the folder name J to the display folder-name creation processing section 28, in response to a ascending-direction discriminating signal from the storing and operating direction discriminating section 21 and the number of display lines from the display-linage storing section 27 of the display section 1.

In the display folder-name creation processing section 28, the desired folder name I is moved to the top line, based on the read out folder name J sent from the ascending-direction reading out section 22 and the mark-position changing signal from the mark-position changing section 25; a display folder name is created so as to display the new next candidate folder name J at the line succeeding the top line; the display folder name is sent to the display section 1 to display thereon. This state is shown in a screen (6-4).

In this state, upon operating the operating section 3 in the descending direction opposed to the operating direction taken up to this time, the storing and operating direction discriminating section 21 receives a pulse from the operating section 3, and discriminates that an operation is done in the descending direction based on a decrease in the number of stored pulses.

Then, the mark-position changing section 25 sends a signal causing a mark M to move to the top line in the descending direction, in response to a descending-direction discriminating signal from the storing and operating direction discriminating section 21 to the display folder-name creation processing section 28 (in the description, although a movement is made only by one line because the number of display lines is two, a description will be specifically given later using a display screen of multiple lines as an example). Meanwhile, the descending-direction reading out section 23 reads out the next candidate folder name H in the descending direction from the folder-name storing section 4 (step ST7); and sends the folder name H to the display folder-name creation processing section 28, in response to a descending-direction discriminating signal from the storing and operating direction discriminating section 21 and the number of display line from the display-linage storing section 27 of the display section 1.

In the display folder-name creation processing section 28, the desired folder name I is moved to the top line, based on the read out folder name sent from the descending-direction reading out section 23 and a mark-position changing signal from the mark-position changing section 25; a display folder name is created so as to display the new next candidate folder name H at the line succeeding the top line; the folder name is then sent to the display section 1 display thereon (steps ST8 and ST9). This state is shown in a screen (6-5).

Figure 7:
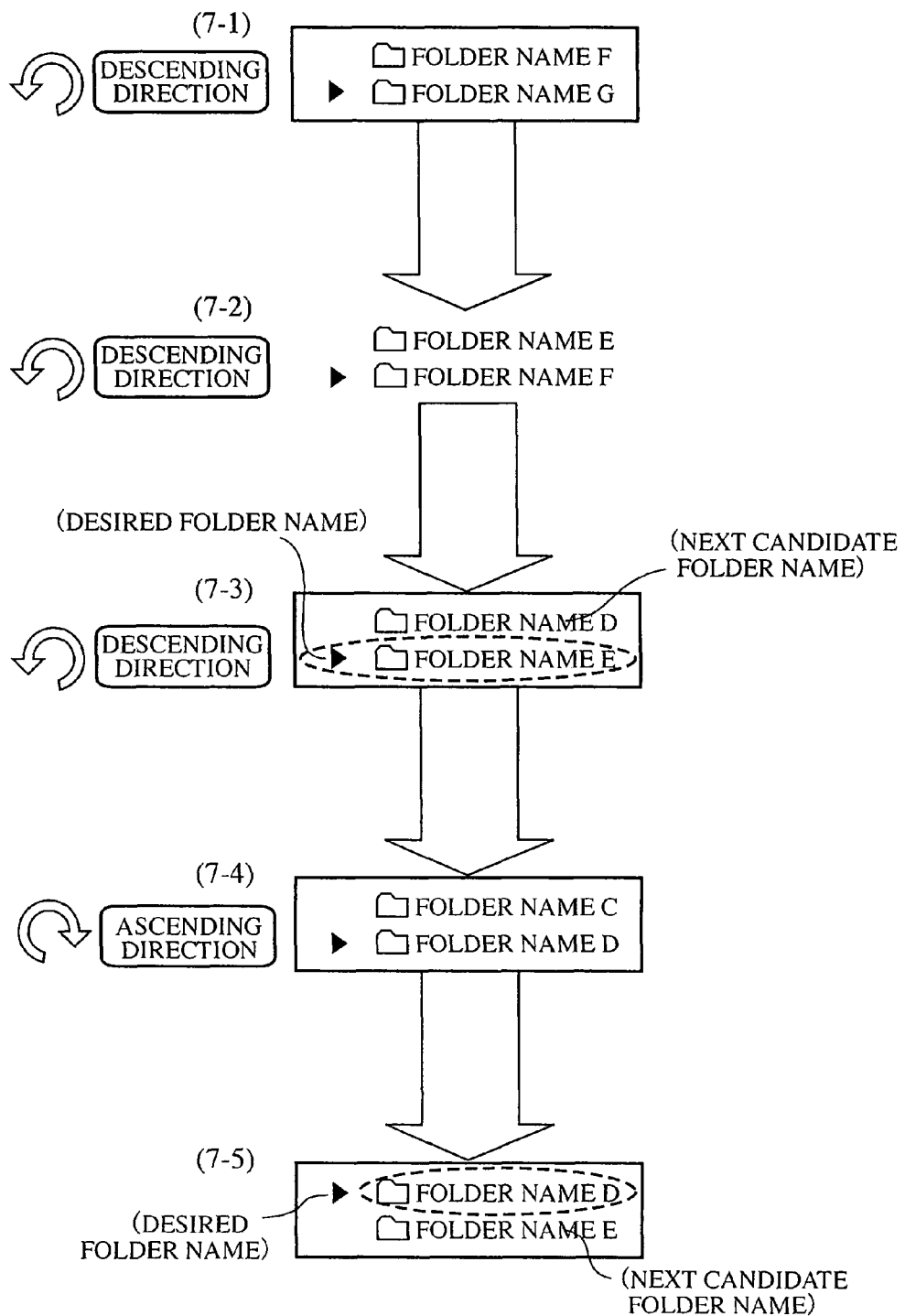
FIG. 7 is a display screen showing a state in which the display contents are changed by an operation in the descending direction in the first embodiment.

FIG. 7 is a view showing an example in which a display state is changed by an operation in the descending direction and finally a display state is changed in the ascending direction opposed to the above operating direction. The specific operations (7-1) to (7-5) changing the display state are the same as (6-1) to (6-5) with the case shown in FIG. 6, and therefore, a prolix repeat is omitted for economy of space.

Figure 8:
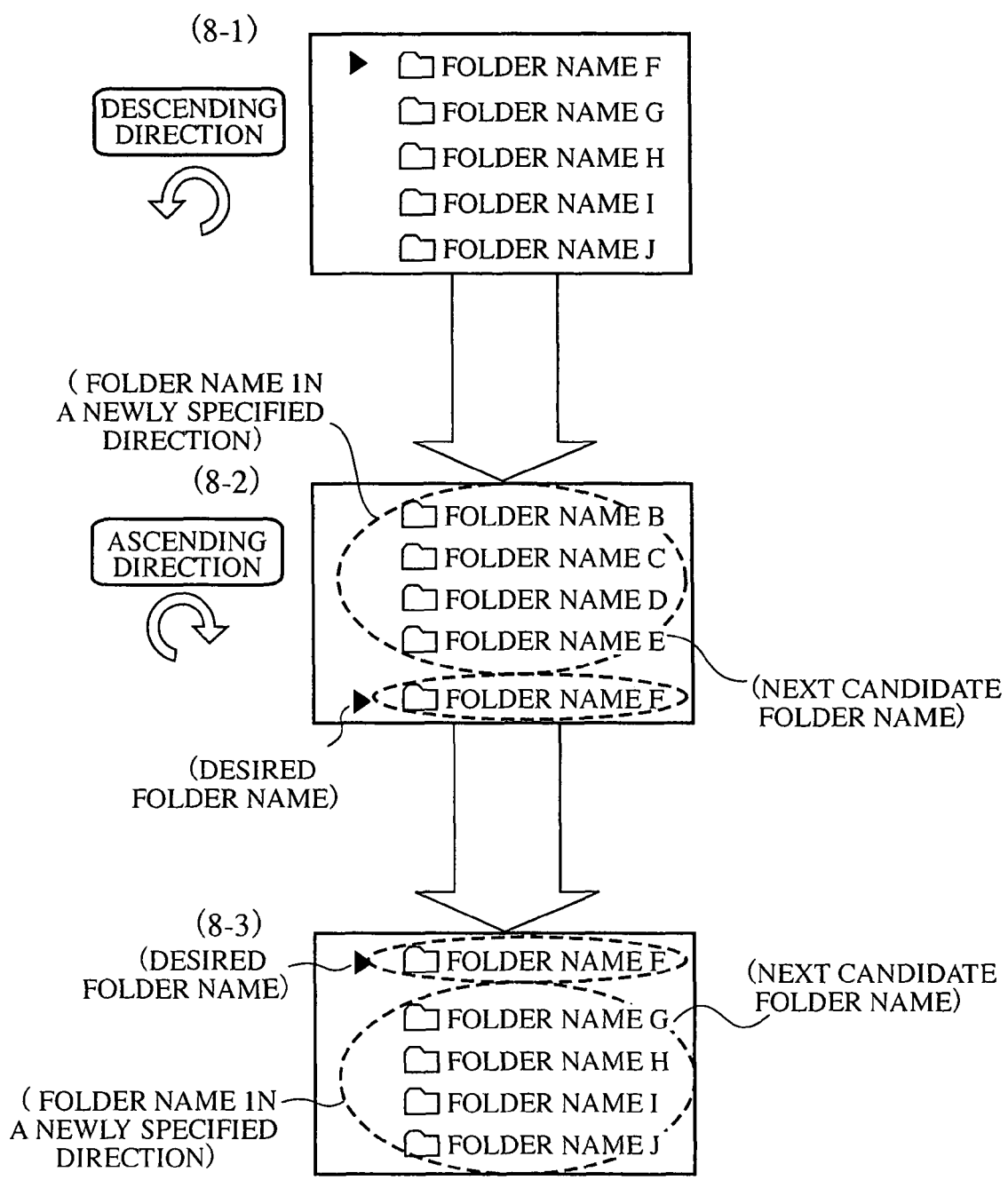
FIG. 8 is a display screen showing a state in which the display contents are changed by an operation in the ascending direction and in the descending direction when the display screen displays 5 lines in the first embodiment.

FIG. 8 is a view showing an example in which the display screen of the display section 1 is set to 5 lines. In FIG. 8, the current desired folder name is the folder name F by an operation in the ascending direction, and the folder names G, H, I, and J succeeding the folder name are displayed in a screen (8-1).

In this state, upon operating the operating section in the descending direction opposed to the operating direction taken up to this time, the storing and operating direction discriminating section 21 discriminates that an operation is done in the descending direction based on a decrease in the number of stored pulses, in response to a pulse from the operating section 3.

Then, the mark-position changing section 25 sends a signal causing a mark M to move to the top line in the descending direction to the display folder-name creation processing section 28, in response to a descending-direction discriminating signal from the storing and operating direction discriminating section 21. Meanwhile, the descending-direction reading out section 23 reads out, at a time, the folder names F, E, D, C, and B in the descending direction, starting from the last folder name, which is now being displayed, i.e., the top folder name F in the descending direction; and sends the folder names to the display folder-name creation processing section 28, in response to a descending-direction discriminating signal from the storing and operating direction discriminating section 21 and the number of display line from the display-linage storing section 27;

In the display folder-name creation processing section 28, based on the read out folder names F, E, D, C, and B sent from the descending-direction reading out section 23 and a mark-position changing signal from the mark-position changing section 25, the display folder names E, D, C, and B are created and sent to the display section 1 to display thereon so as to display the desired folder name F, at the top line and the new next candidate folder name E at the line succeeding the top line (8-2).

Further, in this state, upon operating the operating section 3 in the ascending direction opposed to the above operating direction, first, the storing and operating-direction discriminating section 21 discriminates that an operation is done in the ascending direction, in response to a pulse from the operating section 3 based on an increase in the number of stored pulses.

Subsequently, the mark-position changing section 25 sends a signal causing a mark M to move to the top line in the ascending direction to the display folder-name creation processing section 28, in response to an ascending-direction discriminating signal from the storing and operating direction discriminating section 21. Meanwhile, the ascending-direction reading out section 22 reads out, at a time, the folder names F, G, H, I, and J in the ascending direction, starting from the last folder name, which is now being displayed, i.e., the top folder name F in the ascending direction; and sends the folder names to the display folder-name creation processing section 28, in response to an ascending-direction discriminating signal from the storing and operating direction discriminating section 21 and the number of display line from the display-linage storing section 27 of the display section 1.

In the display folder-name creation processing section 28, based on the read out folder names F, G, H, I, and J sent from the ascending-direction reading out section 22 and a mark-position changing signal from the mark-position changing section 25, the display folder names G, H, I, and J are created, and sent to the display section 1 to display thereon so as to display the desired folder name F, at the top line and the new next candidate folder name G at the line succeeding the top line (8-3).

As described above, according to the first embodiment, whether an operation is done in the ascending direction or in the descending direction, a desired folder name and the next candidate folder name are simultaneously displayed. Furthermore, upon reversing the operating direction, the folder names in the opposite direction, which have not ever been displayed up to now, can be at a time displayed as many as the number of display lines-1, starting from the last folder name. As a result, a searcher can immediately find the folder name, which has been missed and gone too far during retrieval, by reversing the operating direction. In particular, the display screen of the display section has a capacity of displaying multiple lines as shown in FIG. 8, when an operation is done in the opposite direction, the folder names in the opposite direction are at a time displayed as many as the number of display lines-1, starting from the last folder name. Accordingly, a searcher can easily find a desired folder name from among enormous numbers of folder names. Therefore, a desired folder name can be readily and promptly selected from among the music folder names of a massive music library such as a music reproducing unit mounted on a vehicle. The first embodiment provides the retrieval and display device extremely useful and advantageous to a driver.

Second Embodiment

Figure 9:
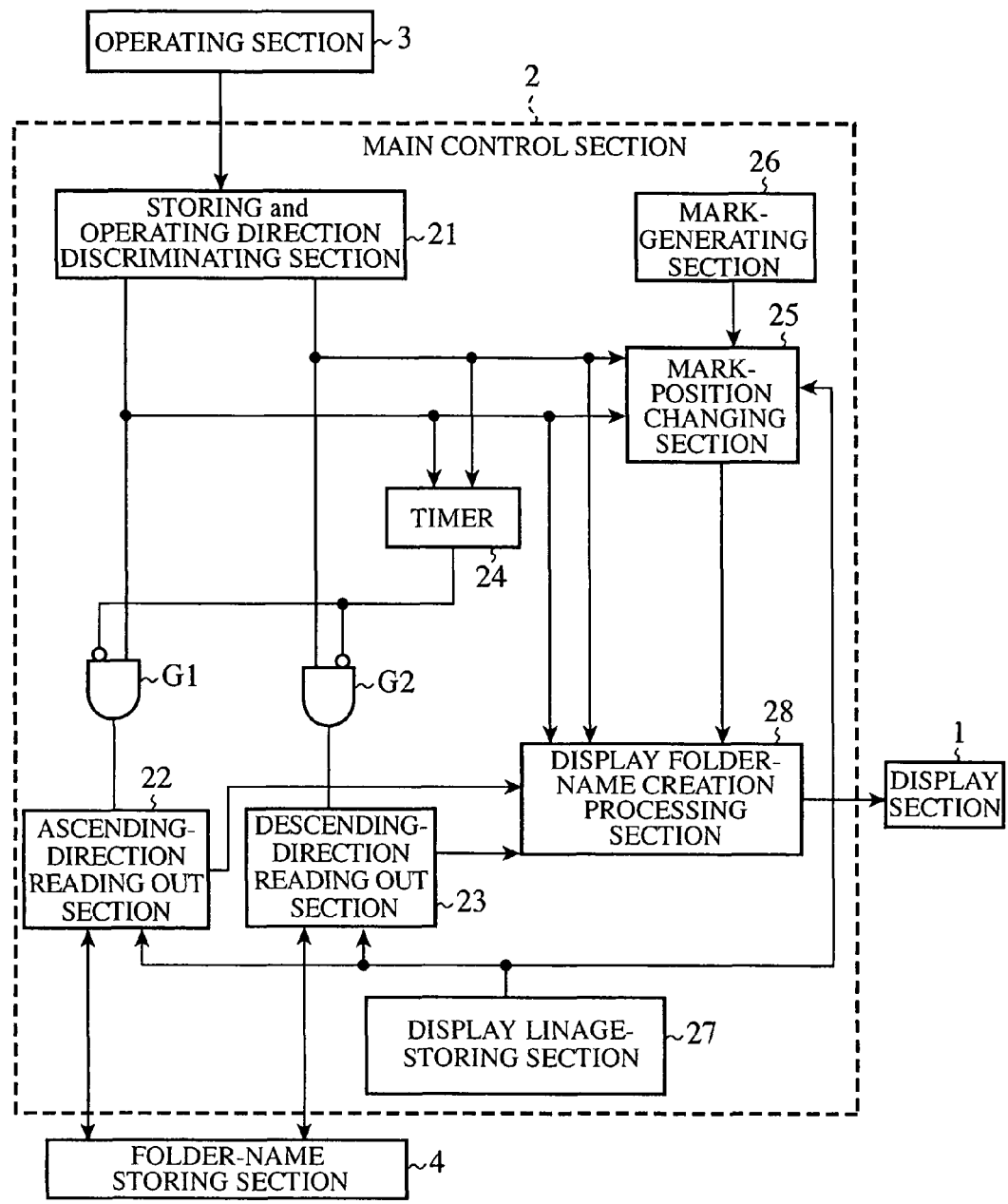
FIG. 9 is a block diagram showing a configuration of the second embodiment.

FIG. 9 is a block diagram showing the main control section 2 according to the second embodiment, and the main control section 2 in the first embodiment shown in FIG. 2 is further provided with a timer 24 starting up its count operation by being received an operating-direction signal from the storing and operating direction discriminating section 21, and with AND gates G1, G2, which are opened and closed by a timer-activating signal from the timer 24.

The operation thereof will now be described below.

Figure 10:
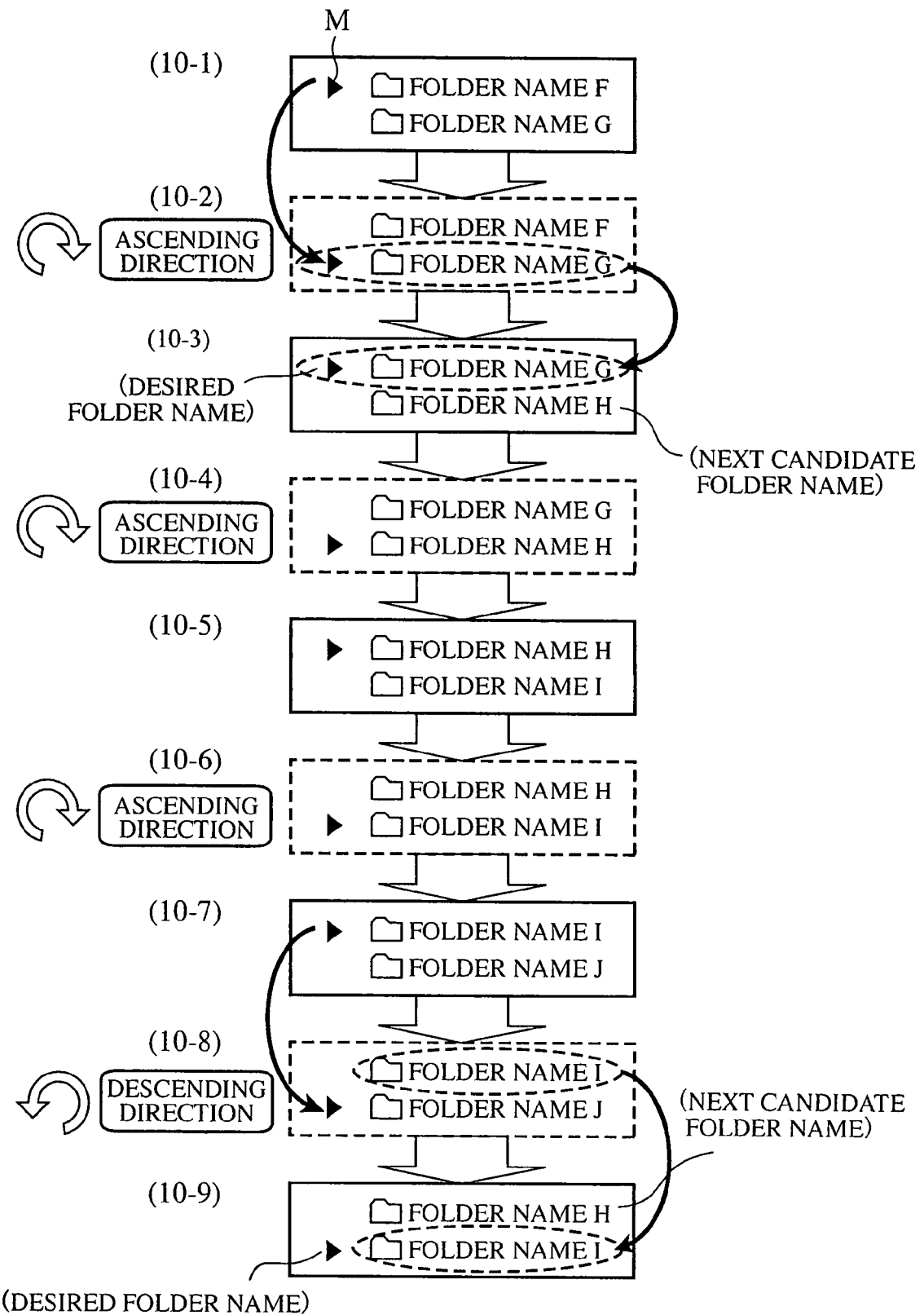
FIG. 10 is a display screen showing a state in which the display contents are changed by an operation in the ascending direction in the second embodiment.

FIG. 10 is a view showing the display screen of the display section 1 of which display contents are changed based on an operation according to the second embodiment. In the second embodiment, the display screen of the display section 1 is set to 2 lines, and the illustration shows the currently desired folder name F and the next candidate folder name G by an operation in the ascending direction (10-1).

In this state, upon operating the operating section 3 by one folder name in the ascending direction, in order to take the folder name G, which is the next candidate folder name, as a desired folder name, first, the storing and operating direction discriminating section 21 discriminates that an operation is done in the ascending direction based on an increase in the number of stored pulses, in response to a pulse corresponding to one folder name from the operating section 3.

Then, the timer 24 and operating-direction discriminating section 21 are started in response to the ascending-direction determining signal from the storing and; a signal, which moves a mark M by one folder name in the ascending direction, is sent to the display folder-name creation processing section 28; the display state in the screen (10-1) for a starting time of, e.g., 250 msec of the timer 24, except that a position at which a mark M is displayed is moved by one folder name in the ascending direction (10-1).

Subsequently, after this display state is held, e.g., for the period of time preset by the timer 24, 250 msec, the AND gates G1, G2 are opened by being received a time up signal; the ascending-direction reading out section 22 reads out the next candidate folder name H in the ascending direction from the folder-name storing section 4; and sends the folder name H to the display folder-name creation processing section 28, in response to a ascending-direction determining signal from the storing and operating direction discriminating section 21 and the number of display lines from the display-linage storing section 27 of the display section 1. In the display folder-name creation processing section 28, based on the read out folder name H sent from the ascending-direction reading section 22 and the mark-position changing signal from the mark-position changing section 25, the desired folder name G is moved to the top line; a display folder name is created such that the new next candidate folder name H is displayed at the line succeeding the top line; and the display folder name is sent to the display section 1 to display thereon. This state is shown in a screen (10-3).

In this state, when operating the operating section 3 again by one folder name in the ascending direction, in order to take the folder name H, which is the next candidate folder name, as a desired folder name, first, the storing and operating direction discriminating section 21 discriminates that an operation is done in the ascending direction based on an increase in the number of stored pulses, in response to a pulse corresponding to one folder name from the operating section 3.

Then, the timer 24 and the mark-position changing section 25 are started in response to an ascending-direction discriminating signal from the storing and operating direction discriminating section 21; a signal, which moves a mark M by one folder name in the ascending direction, is sent to the display folder-name creation processing section 28; and the display state shown in the figure (10-3) is maintained, e.g., for the period of the starting time of the timer 24, 250 msec, except that a position at which a mark M is displayed is moved by one folder name in the ascending direction (10-4).

Subsequently, after this display state is maintained, e.g., for the period of time preset by the timer 24, 250 msec, the AND gates G1, G2 are opened by being received a time up signal; the ascending-direction reading out section 22 reads out the next candidate folder name I in the ascending direction from the folder-name storing section 4; and sends the folder name I to the display folder-name creation processing section 28, in response to a ascending-direction discriminating signal from the storing and operating direction discriminating section 21 and the number of display lines from the display-linage storing section 27 of the display section 1. In the display folder-name creation processing section 28, based on the read out folder name I sent from the ascending-direction reading out section 22 and a mark-position changing signal from the mark-position changing section 25, the desired folder name H is moved to the top line; a display folder name is created such that the new next candidate folder name I is displayed at the line succeeding the top line; the display folder name is sent to the display section 1 to display thereon. This state is shown in a screen (10-5).

In this state, operating the operating section 3 by one folder name in the ascending direction, in order to take the folder name I, which is the next candidate folder name, as a desired folder name, the storing and operating direction discriminating section 21 discriminates that an operation is done in the ascending direction based on an increase in the number of stored pulses, in response to a pulse corresponding to the one folder name from the operating section 3.

Then, the timer 24 and the mark-position changing section 25 are started by a ascending-direction discriminating signal from the storing and operating direction discriminating section 21; a signal, which moves a mark M by one folder name in the ascending direction, is sent to the display folder-name creation processing section 28; the display state shown in the figure (10-5) is maintained, e.g., for the period of the operating time of the timer 24, 250 msec, except that a position at which a mark M is displayed is moved by one folder name in the ascending direction (10-6).

Further, after this display state is maintained, e.g., for the period of time preset by the timer 24, 250 msec, the AND gates G1, G2 are opened in response to a time up signal; the ascending-direction reading out section 22 reads out the next candidate folder name J in the ascending direction from the folder-name storing section 4; and sends the folder name J to the display folder-name creation processing section 28, in response to an ascending-direction determining signal from the storing and operating direction discriminating section 21 and the number of display lines from the display-linage storing section 27 of the display section 1. In this display folder-name creation processing section 28, based on the read out folder name J sent from the ascending-direction reading out section 22 and a mark-position changing signal from the mark-position changing section 25, the desired folder name I is moved to the top line; a display folder name is created such that the new next candidate folder name J is displayed at the line succeeding the top line; the display folder name is sent to the display section 1 to display thereon. This state is shown in a screen (10-7).

In this state, operating the operating section 3 by one folder name in the descending direction opposed to the above operating direction, the storing and operating direction discriminating section 21 discriminates that an operation is done in the descending direction based on a decrease in the number of stored pulses, in response to a pulse corresponding to one folder name from the operating section 3.

After that, the timer 24 and the mark-position changing section 25 are started by a descending-direction discriminating signal from the storing and operating direction discriminating section 21; a signal, which moves a mark M to the top line in the descending direction, is sent to the display folder-name creation processing section 28; the display state shown in a screen (10-7) is maintained, e.g., for the period of the starting time of the timer 24, 250 msec, except that a position at which a mark M is displayed is moved in the descending direction (10-8) (in the specification, an explanation is made that only one line is moved because the number of display lines is two; however, a description will be specifically given later by taking a display screen of many lines as an example).

Then, after this display state is maintained, e.g., for the period of time preset by the timer 24, 250 msec, the AND gates G1, G2 are opened in response to a time up signal; the descending-direction reading out section 23 reads out the next candidate folder name H in the ascending direction from the folder-name storing section 4; and sends the folder name H to the display folder-name creation processing section 28, in response to a descending-direction discriminating signal from the storing and operating direction discriminating section 21 and the number of display lines from the display-linage storing section 27. In the display folder-name creation processing section 28, based on the read out folder name H sent from the descending-direction reading out section 23 and a mark-position changing signal from the mark-position changing section 25, the desired folder name I is moved to the top line; a display folder name is created such that the new next candidate folder name H is displayed at the line succeeding the top line; the display folder name is sent to the display section 1 to display thereon. This state is shown in a screen (10-9).

Figure 11:
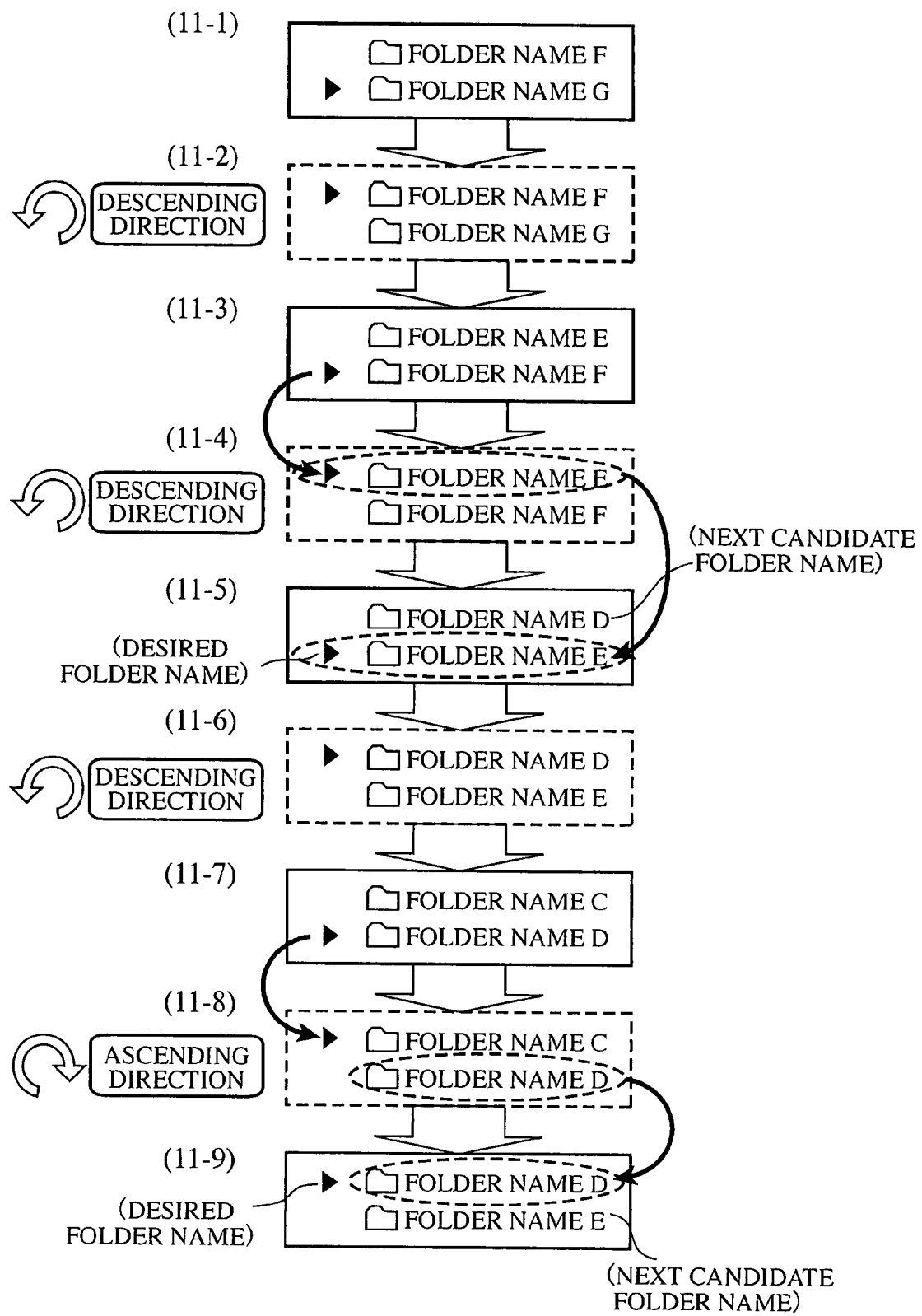
FIG. 11 is a display screen showing a state in which the display contents are changed by an operation in the descending direction in the second embodiment.

FIG. 11 is an example in which the display state is firstly changed by an operation in the descending direction, and the display state is finally changed by an operation in the opposite ascending direction. The specific operations (11-1) to (11-9) changing the display state are the same as (10-1) to (10-9) in the case shown in FIG. 10, and therefore, unnecessary repetitions are omitted for simplicity.

Figure 12:
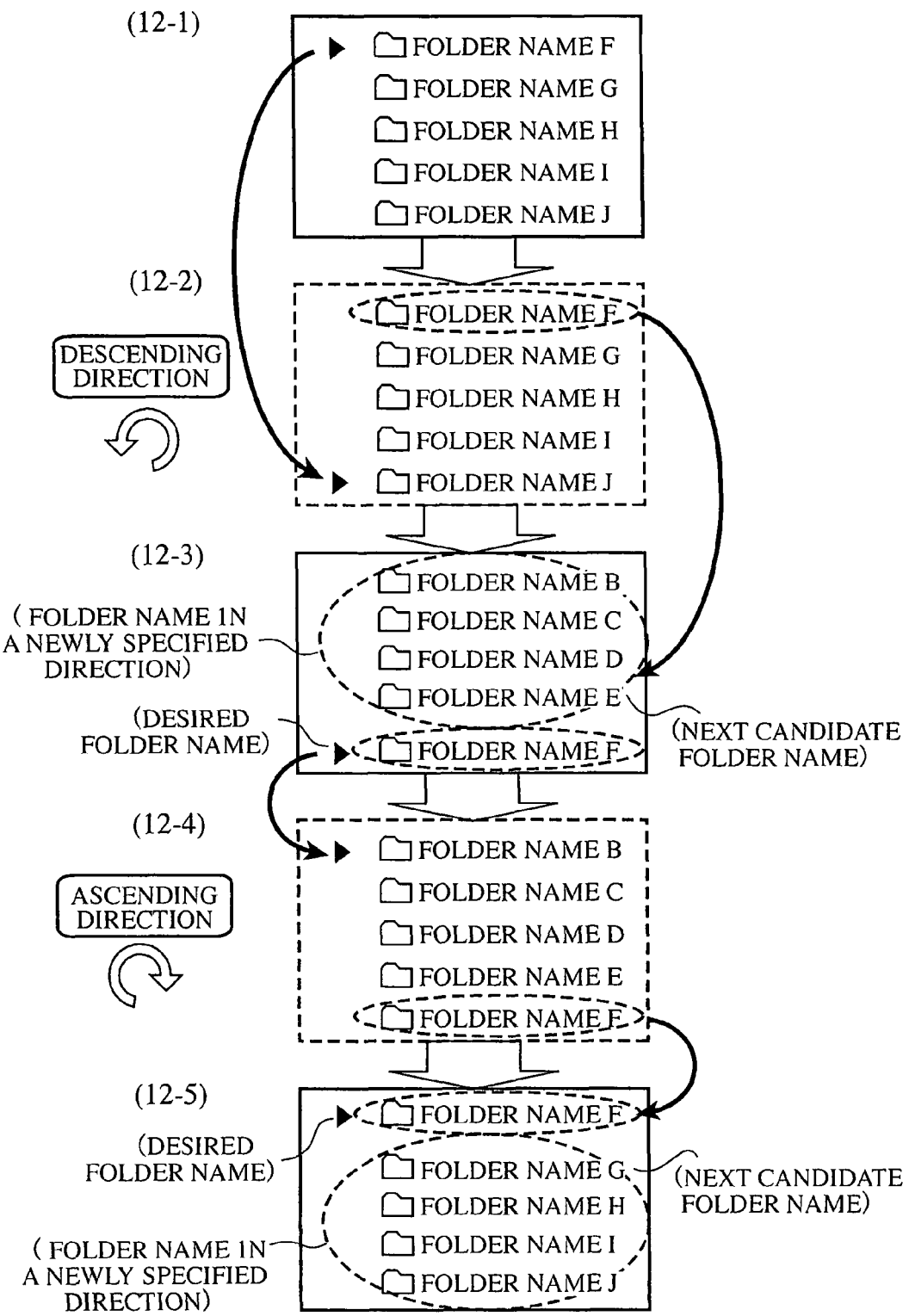
FIG. 12 is a display screen showing a state in which the display contents are changed by an operation in the ascending directions and in the descending direction when the display screen displays 5 lines in the second embodiment.

FIG. 12 is an example in which the display screen of the display section 1 is set to 5 lines. In FIG. 12, the folder name currently desired to be selected is a folder name F by an operation in the ascending direction, and the folder names G, H, I, and J succeeding the folder name F are displayed in a screen (12-1).

In this state, operating the operating section 3 in the descending direction opposed to the operating direction taken up to this time, the storing and operating direction discriminating section 21 discriminates that an operation is done in the descending direction based on a decrease in the number of stored pulses, in response to a pulse from the operating section 3.

Then, the timer 24 and the mark-position changing section 25 are started by a descending-direction discriminating signal from the storing and operating direction discriminating section 21; a changing signal, which moves a mark M to the presently displayed last line, namely, to the top line in the descending direction, is sent to the display folder-name creation processing section 28; and the display state shown in the screen (12-1) is maintained, e.g., for the operating time of the timer 24, 250 msec, except that a position at which a mark M is displayed is moved to the top line in the descending direction (12-2).

Further, after this display state is maintained, e.g., for the period of time preset by the timer 24, 250 msec, the AND gates G1, G2 are opened by being received a time up signal, the descending-direction reading-out section 23 reads out the folder names F, E, D, C, and B in the descending direction from the folder-name storing section 4; and sends these folder names to the display folder-name creation processing section 28, in response to a descending-direction discriminating signal from the storing and operating direction discriminating section 21 and the number of display lines from the display-linage storing section 27. In the display folder-name creation processing section 28, based on the read out folder names F, E, D, C, and B sent from the descending-direction reading out section 23 and the mark-position changing signal from the mark-position changing section 25, the display folder names F, E, D, C, and B are created, and sent to the display section 1 to display thereon such that the desired folder name F is displayed at the top line and the new next candidate folder name E is displayed at the line succeeding the top line (12-3).

Further, in this state, operating the operating section 3 in the ascending direction opposed to the operating direction taken up to this time, the storing and operating direction discriminating section 21 discriminates that an operation is done in the ascending direction based on an increase in the number of stored pulses, in response to a pulse from the operating section 3.

Then, the timer 24 and the mark-position changing section 25 are started by an ascending-direction discriminating signal from the storing and operating direction discriminating section 21; a changing signal, which moves a mark M to the presently displayed last line, namely, to the top line in the ascending direction, is sent to the display folder-name creation processing section 28; and the display state shown in the screen (12-3) is maintained, e.g., for the starting time of the timer 24, 250 msec, except that a position at which the mark M is displayed is moved to the top line in the ascending direction (12-4).

Further, after this display state is maintained, e.g., for the period of time preset in the timer 24, 250 msec, the AND gates G1, G2 are opened by being received a time up signal; the ascending-direction reading out section 22 reads out the folder names F, G, H, I, and J in the ascending direction from the folder-name storing section 4; and sends these folder names to the display folder-name creation processing section 28, in response to an ascending-direction discriminating signal from the storing and operating direction discriminating section 21 and the number of display lines from the display-linage storing section 27. In the display folder-name creation processing section 28, based on the read out folder names F, G, H, I, and J sent from the ascending-direction reading out section 22 and a mark-position changing signal from the mark-position changing section 25, the display folder names F, G, H, I, and J are created, and sent to the display section 1 to display thereon such that the desired folder name F is displayed at the top line and the new next candidate folder name G is displayed at the line succeeding the top line (12-5).

Hereupon, while the storing and operating direction discriminating section 21 shown in the figure is explained by stating that the discriminating section discriminates the operating direction based on an increase or a decrease in the pulse signal, identified by comparing the input pulse signal with the stored one, in response to a pulse signal having a polarity, which is changed according to the operating direction input to the discriminating section from the operating section 3, a signal output from the operating section 3 is not limited thereto. Instead, the discriminating section may discriminate the operating direction by using a signal having a value, which is changed according to an operating direction (resistance or voltage, etc) and comparing this signal with the stored signal.

As mentioned above, according to the second embodiment, whether an operation is done in the ascending direction or in the descending direction, the desired folder name and the next candidate folder name are simultaneously displayed. Further, when reversing the operating direction, the folder names stored in the opposite direction, which have not ever been displayed up to now, can be at a time displayed by the number of display lines minus one line, starting from the last folder name. Therefore, an effect similar to that with the first embodiment is obtained. Furthermore, according to the second embodiment, since it is arranged that only the position at which a mark M showing an operating direction is displayed is moved without changing the display contents for a predetermined time every time the operation for changing the display contents is done, a user can promptly and accurately recognize that in which direction an operation is carried out, by seeing a change of the position at which mark M is displayed. For this reason, a searcher can easily find a desired folder name from among enormous numbers of folder names.

INDUSTRIAL APPLICABILITY

As mentioned hereinabove, the retrieval and display device according to the present invention enables a searcher to easily select the desired folder name within a limited display screen, and therefore, the retrieval and display device is suitable for use on-vehicle music reproducing units or the like.

The invention claimed is:

1. A retrieval and display device comprising:
   a display section having a display screen able to display at least two or more lines of a folder name;
   a folder-name storing section storing enormous numbers of folder names;
   a display-linage storing section storing the number of display lines of the display section;
   an operating section generating an operating signal for indicating a direction in which the folder name is read out;
   a storing and operating direction discriminating section, when receiving the operating signal from the operating section, discriminates the operating direction in comparison with the operating direction stored therein;
   a downward-direction reading out section and an upward-direction reading out section reading out a folder name from the folder-name storing section, in response to an operating-direction signal from the storing and operating direction discriminating section and a display-linage signal stored in the display-linage storing section;
   a mark-position changing section changing a position at which a mark output from a mark-generating section is displayed, in response to the operating direction signal from the storing and operating direction discriminating section; and
   a display folder-name creation processing section receiving folder names corresponding to the number of display lines from the downward-direction reading out section or the upward-direction reading out section, receiving a mark-position changing signal from the mark-position changing section, putting the mark on a desired folder name, and displaying the desired folder name on which the mark is put, on the display section, wherein
   the mark-position changing section changes a position at which the mark is displayed, from the top line to the bottom line or from the bottom line to the top line in the two or more display lines of the display section, in response to a changing signal for indicating that the operating direction is changed between an downward-direction and an upward-direction, from the storing and operating direction discriminating section, and
   the mark-position changing section changes the position at which the mark is displayed, from the top line to the bottom line in response to the changing signal for indicating that the operating direction is changed from the downward-direction to the upward-direction, and from the bottom line to the top line in response to the changing signal for indicating that the operating direction is changed from the upward-direction to the downward-direction.

2. The retrieval and display device according to claim 1, further comprising a timer starting up by the operating-direction signal, wherein an instruction to the downward-direction reading out section and the upward-direction reading out section is stopped for the period of time preset by the timer, the display folder-name creation processing section displays the folder names without changing the folder names, only by changing a position at which the mark is displayed, from the top line to the bottom line or from the bottom line to the top line in the two or more display lines of the display section according to the mark-position changing signal from the mark-position changing section.

\* \* \* \* \*